Aug. 17, 1965  J. VAN WILGEN ETAL  3,201,681
SUPPLY CIRCUIT AND ABRUPT CURRENT AND VOLTAGE
LIMITING MEANS THEREFOR
Filed May 26, 1961  2 Sheets-Sheet 1

INVENTOR
JACOB VAN WILGEN.
JAN NIJMEYER.
BY ALBERT C. LAMPE
AGENT

United States Patent Office 3,201,681
Patented Aug. 17, 1965

3,201,681
SUPPLY CIRCUIT AND ABRUPT CURRENT AND VOLTAGE LIMITING MEANS THEREFOR
Jacob Van Wilgen, Jan Nijmeyer, and Albert Cornelis Lampe, Eindhoven, Netherlands, assignors to North American Philips Company, Inc., New York, N.Y., a corporation of Delaware
Filed May 26, 1961, Ser. No. 112,898
Claims priority, application Netherlands, June 24, 1960, 253,080
8 Claims. (Cl. 323—20)

This invention relates to a transistor circuit arrangement for limiting the current supplied by a voltage source to a load and the voltage set up across the load. In particular, it relates to an arrangement in which transistors controlled by said current and voltage are used for the limiting or regulating process.

Such regulating circuits are generally known, for example, from U.S. Patent No. 2,759,142. In the known circuit, a source of direct voltage proportional to the current supplied to the load is connected between the base and the emitter of a first transistor, while the base-emitter circuit of a second transistor is connected to the series-combination of a source of direct voltage proportional to the applied voltage and a source of reference direct voltage of opposite polarity. Arrangements of this kind, which maintain the current substantially constant until the load voltage reaches a predetermined maximum value and then abruptly reduce the current, are particularly suitable for controlling a current source which charges a storage battery; the current source may be a rotary generator driven at a greatly varying speed, for example, a generator of a motor vehicle or of an aircraft. Storage batteries and especially alkaline batteries are highly sensitive to an excessive charging current and/or charging voltage. Therefore, a current-voltage characteristic having a very sharp knee is desirable, not only for rapidly charging the battery to the maximum charge voltage, but also to prevent this voltage from being exceeded in operation.

The invention relates to a current and voltage limiting circuit in which a current-voltage characteristic having a very sharp knee is obtained by very simple means. According to one aspect of the invention, at least two transistors are used and the current-dependent control voltage for the first transistor is also applied, in the same direction as the reference voltage, between the base and the emitter of the second transistor. As a result, the current limitation by means of the first transistor is abruptly replaced by the voltage limitation by means of the second transistor.

In such an arrangement for limiting the current and voltage of a direct voltage source, the current-dependent control voltage for the first transistor may be readily produced in known manner across a series resistor connected between one terminal of the voltage source and the corresponding terminal of the load. In addition, the base of the second transistor may be connected, through a Zener diode acting as a reference voltage source, to at least part of the voltage across the load. If these connections are made, the junction of the second transistor's base and the Zener diode is preferably connected to the said terminal of the voltage source through a resistor, while the emitter of the second transistor being connected to the corresponding terminal of the load.

The first and second transistors may control an amplifier transistor which limits the current supplied to the load and the voltage set up across the load. In this event, the control capability of the arrangement is obviously restricted by the maximum permissible voltage across the amplifier transistor, by the maximum permissible current through its emitter-collector path and/or by its maximum permissible energy dissipation. This control capability may be increased by using the amplifier transistor as a switch.

The load and/or the voltage source may have a certain time constant due, for example, to mechanical inertia or to a considerable reactive component; under these conditions, the amplification over the closed loop comprising the voltage source, the load, the first and/or the second transistor, and an amplifier transistor (if used), may exceed unity in a certain frequency range so that the arrangement will operate as an astable trigger. This tendency to oscillate may be counteracted by means of filtering RC-networks. However, the feedback may also be promoted to a certain frequency by means of one or a number of RC-networks, so that the arrangement will operate as an astable trigger under all operating conditions which may be met with in practice, the ratio between the conductive and non-conductive periods of the amplifier transistor varying in accordance with the current-dependent control voltage for the first transistor and/or the voltage across the load. In one embodiment of the arrangement according to the invention this operation is obtained in a very simple manner by means of feedback capacitors connected between the junction of the amplifier transistor and of a control impedance connected in its emitter-collector circuit and the bases of the first and second transistors.

In order that the invention may readily be carried out, two embodiments thereof will now be described, by way of example, with reference to the accompanying diagrammatic drawings, in which.

Figure 1:
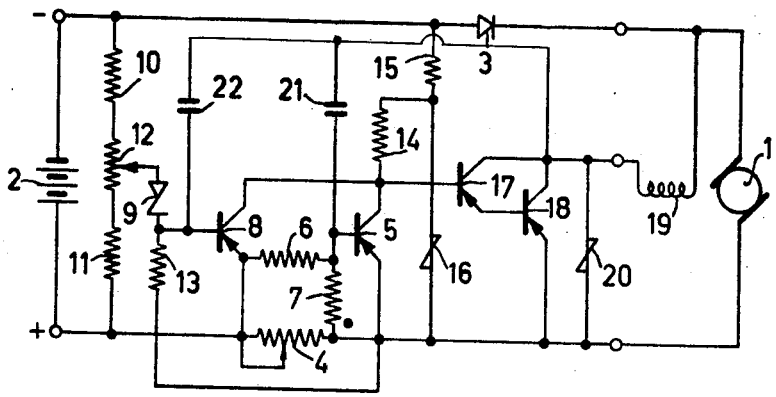
FIG. 1 is a schematic circuit diagram of an embodiment of the arrangement according to the invention.

Referring now to FIG. 1, a circuit is shown therein for limiting the current supplied by a charging generator 1 to a storage battery 2 having a rated voltage of, for example, 12 v. and for limiting the voltage applied across this battery. One terminal of the charging generator 1 is connected through a rectifier 3, which may be of the type OA 250, to the negative terminal of the battery 2, and the other terminal is connected through a variable series resistor 4 which may consist of a length of constantan wire and having a maximum value of, for example, 0.026 ohm to the positive terminal of said battery. The circuit includes a first transistor 5 which may be of the type OC 75, the emitter of which is directly connected to the positive output terminal of the generator 1; the base of transistor 5 is controlled, through a voltage divider comprising a first resistor 6, for example, a wire resistor of 200 ohm, and a resistor 7 having a negative temperature coefficient, which may be of the type B 8320 ooA/500 E, by the voltage drop across the series resistor 4. The circuit also includes a second transistor 8 of the same conductivity type, the emitter of which is directly connected to the positive terminal of the battery 2 and the base of which is connected through a Zener diode 9, which acts as a gate and also as a source of reference voltage, to a tap on a resistive voltage divider. This voltage divider comprises the series-combination of two fixed resistors 10 and 11 of 39 and 60 ohm, respectively, and of a wire potentiometer 12 of 15 ohm, the moving contact of which forms the tap on the voltage divider. This voltage divider is connected in parallel with the battery 2 between the output terminals of the arrangement. Through a resistor 13 of, for example, 180 ohm the base of the second transistor 8 is also connected to the positive terminal of the generator 1.

The collectors of the transistors 5 and 8 are connected to a common load circuit. This load circuit comprises the series-combination of two resistors 14 and 15 of 1200 ohm and 68 ohm, respectively; the junction of these resistors is connected through a voltage-dependent resistor 16, which may be of the type E 299 DE/P 116, to the positive terminal of the generator 1, and the other end of the resistor 15 is connected to the negative terminal of the battery 2. The junction of the collectors of the transistors 5 and 8 and the resistor 14 is connected to the base of an amplifying transistor 17, which may be of the type OC 76. This transistor is connected as an emitter follower. Its emitter is connected solely and directly to the base of a power transistor 18, which may be of the type OC 26, the emitter of which is directly connected to the positive terminal of the generator 1. The collector of the amplifying transistor 17 and that of the power transistor 18 controlled by the amplifying transistor are connected to a common load circuit. This load circuit comprises the energizing winding 19 of the generator 1. One end of this winding is directly connected to the collectors of transistors 17 and 18, and the other end is connected to the negative terminal of the generator 1. A second voltage-dependent resistor 20, which may be of the type EC299 DH/P 124, bridges the emitter-collector path of the transistor 18. The junction of the collectors of the transistors 17 and 18, of the energizing winding 19 and of the voltage-dependent resistor 20 is connected through feedback capacitors 21 and 22 of, for example 0.01 $\mu$f. each, to the bases of the first and second transistors 5 and 8, respectively.

It is apparent that rectifier 3 passes a charging current from the generator 1 to the battery 2, while a current in the opposite direction is blocked by this rectifier; therefore, the battery 2 cannot discharge through the generator 1 and/or through the energizing winding 19 thereof.

When the charging current flowing through the variable resistor 4 reaches a certain value for example, 13 A., the first transistor 5 becomes conductive; when this occurs, the base of the amplifying transistor 17 is connected substantially directly to the positive terminal of the generator 1 through the conducting collector-emitter path of the transistor 5. As a result, the amplifying transistor 17 and the power transistor 18 are substantially cut off, so that the current through the winding 19 is interrupted. Since the resistors 6 and 7 provide voltage division, the variation with temperature of the threshold voltage of the transistor 5 is compensated; this threshold voltage is the base-emitter voltage at which the transistor 5 becomes conductive. As is known, this base-emitter voltage decreases with increase in the temperature, and the control voltage applied between the base and the emitter of the transistor 5 also decreases with increase in temperature, since the value of the negative temperature coefficient resistor 7 decreases with increase in temperature.

The second transistor 8 is normally cut off, because its base is connected through the resistor 13 to the positive terminal of the generator 1, so that the voltage drop across the resistor 4 acts in the reverse direction for this transistor. If, however, the voltage at the terminals of the battery 2 exceeds the predetermined adjusted value, the Zener diode 9 becomes conductive; since the differential resistance of this diode, when this occurs is small as compared with the value of the resistor 13; the transistor 8 is the abruptly rendered conductive due to the sum of the voltage drops across the resistor 11 and the lower part of the potentiometer 12 less the Zener voltage across the diode 9. When the transistor 8 becomes conductive, the amplifier transistor 17 and the power transistor 18 are substantially cut off again. The charging generator 1 is no longer energized and the voltage across the battery 2 cannot be further increased.

Due to the fact that the resistor 13 is connected to the generator end of the resistor 4 while the emitter of the transistor 8 is connected to the battery end of this resistor, the Zener diode 9 becomes conductive at a slightly earlier time than that at which the terminal voltage of battery 2 exceeds the adjusted value; this time will be that at which the voltage across the lower part of the voltage divider 10, 11, 12, increased by the voltage drop across the resistor 4, exceeds the Zener voltage of diode 9. The transistor 8, however, becomes conductive only at the time at which the voltage drop across the resistor 13 exceeds the threshold voltage of the transistor 8 increased by the voltage drop across the resistor 4. This voltage drop is equal to the voltage across the lower part of the voltage divider 10, 11, 12 increased by the voltage across the resistor 4 and reduced by the Zener voltage of the diode 9. When the transistor 5 is conductive, the voltage drop across the resistor 4 is greater than the threshold voltage of this transistor, the latter being substantially equal to the threshold voltage of the transistor 8. Hence, the transistor 8 can only become conductive if the voltage across the lower part of the voltage divider exceeds the Zener voltage of the diode 9 by at least about twice its threshold voltage or, when the transistor 5 is not conducting, the transistor 8 can only become conductive if the voltage across the lower part of the voltage divider exceeds the Zener voltage at least by its threshold voltage. As a result, the voltage drop across the resistor 4 counteracts the opening of the transistor 8, so that the transition from the pulse operation with current control through the transistor 5 to the pulse operation with voltage control through the transistor 8 is effected abruptly and readily.

In operation, the current through the resistor 4 is controlled by means of the energizing current through the winding 19 of the generator 1, both when the transistor 5 becomes conductive and when the transistor 8 is driven into its conductive range by the voltage across the battery 2. In the latter case (voltage control), the decrease of the current through the resistor 4 brings about a decrease of the voltage drop across this resistor, so that the transistor 8 becomes more highly conductive and the amplifying and power transistors 17 and 18 are driven more strongly in the reverse direction, so that the current traversing the energizing winding 19 and hence the charging current decrease cumulatively.

This would give rise to instability, since owing to the voltage drop across the resistor 4 the maximum charging current would flow until the battery voltage should be equal to the adjusted value increased by $1/p$ times the voltage across the resistor 4, where $p$ is the ratio between the resistance of the lower part of the voltage divider 10, 11, 12 and the overall resistance of this voltage divider. When the battery voltage reaches this value, the transistor 8 would indeed become increasingly conductive, since the voltage across the resistor 4 would rapidly decrease. The charging current would suddenly fall from its maximum value to zero, but for the fact that due to the internal resistance of the battery the battery voltage decreases with the charging current.

In spite of this internal resistance, an instability is produced by the feedback through capacitors 21 and 22 from the junction of the collectors of the transistors 17 and 18 and of the energizing winding 19 to the bases of the transistors 5 and 8, respectively. Hence, either transistor 5 or 8 becomes conductive and the circuit operates as an astable multivibrator when the charging current or the battery voltage exceeds a certain value. From this instant, only periodic charge current pulses are supplied to the battery 2. The ratio between the conductive period of the amplifier transistor 17 and power transistor 18 and the non-conductive periods of these transistors is controlled in accordance with the current-dependent control voltage for the first transistor 5 (voltage drop across the resistor 4) or in accordance with the voltage across the terminals of the battery 2.

Owing to the trigger action of the stages including the transistors 17 and 18 or 5 and 8, respectively, the transistors 17 and 18 are either substantially non-conductive or highly conductive. In both cases, the energy dissipated in the transistors 17 and 18 is a minimum, either because the collector current of these transistors is very small or because the voltage drop across their emitter-collector paths is very small. Due to the presence of the capacitors 21 and 22, the cut-off period of the transistors 17 and 18 is prolonged and stabilized at a value related to the value of the capacitor 21 or 22 and of the base resistor 4, 6, 7 or 13 of the corresponding transistor, respectively. The frequency at which the transistors 17 and 18 are controlled thus depends on the extent to which the current strength or adjusted terminal voltage is exceeded. Hence, the energizing current of the generator is periodically switched off for a certain short period of time, the switching frequency being controlled so that the mean energizing current corresponds with the charging current and/or battery voltage desired.

The voltage-dependent resistor 16 stabilizes the voltage set up at the junction of the resistors 14 and 15 at a value of, for example, about 9 v. Consequently, the operation of the transistors 5 and 8 becomes substantially independent of the value of the output voltage of the device.

The voltage-dependent resistor 20 protects the transistors 17 and 18 from overvoltages which may occur on interruption of the energizing currents through the winding 19.

Figure 2:
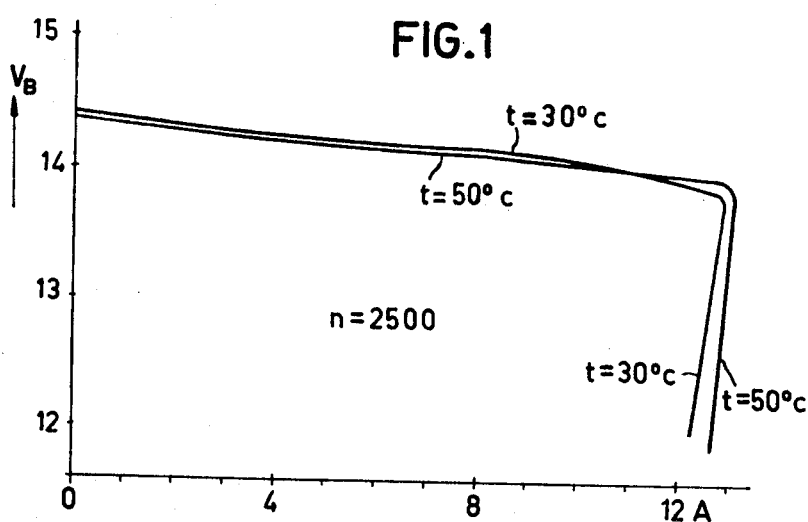
FIG. 2 shows current-voltage characteristic curves of the embodiment of FIG. 1 at two different operating temperatures.

FIGURE 2 shows the current-voltage characteristic curves of a circuit of the kind shown in FIGURE 1 at two different ambient temperatures 30 degrees centigrade and 50 degrees centigrade. These curves show that the residual influence of the ambient temperature is comparatively small both on the current and on the voltage.

Figure 3:
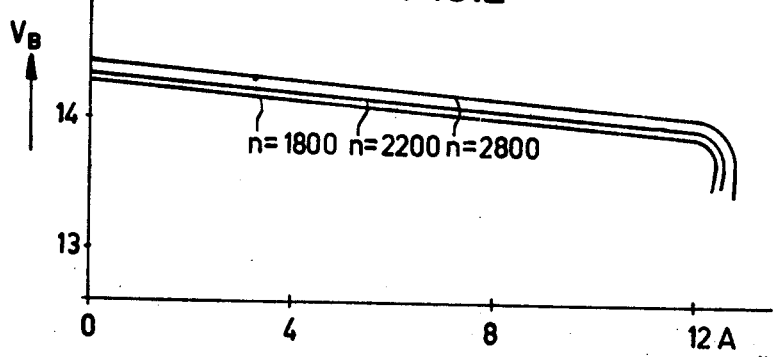
FIG. 3 shows current-voltage characteristic curves of the embodiment of FIG. 1 at three different speeds of a rotary generator which acts as the voltage source.

FIGURE 3 shows the current-voltage characteristic curves of the same circuit for three different speeds of the generator 1. As can be seen, the influence of the speed on the current and voltage is also very small. The characteristic curves both of FIGURE 3 and of FIGURE 2 further show that the transition from current limitation by means of the first transistor 5 to voltage limitation by means of the second transistor 8 (horizontal branches of the characteristic curves) is very sharp. The charging current is maintained substantially constant at a value of from 12 to 13 a. and decreases abruptly when the battery voltage reaches a value of from 14.3 to 14.5 v.

Figure 4:
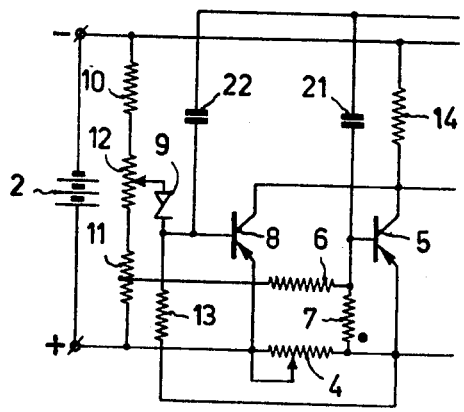
FIG. 4 is a schematic circuit diagram of a modification of the embodiment shown in FIG. 1.

In the modified embodiment shown in FIGURE 4, the resistor 14 is directly connected to the negative terminal of the battery 2. The stabilizing action of the voltage-dependent resistor 16 in combination with the resistor 15 is replaced by an additional voltage control for the transistor 5. This is achieved by connecting the resistor 6 to a second tap on the voltage divider 10, 12, 11, which tap is provided on the resistor 11, instead of to the emitter of the transistor 8. This voltage control compensates for variations of the collector voltages of the transistors 5 and 8 which may occur on variation of the battery voltage.

It will be appreciated that the embodiments shown and described are illustrative only, many modifications thereof being readily apparent to those skilled in the art without departing from the spirit of the invention, the scope of which is set forth in the appended claims. It is also specifically pointed out that the quantitative values given for various components are illustrative only, to enable ready practice of the invention.

What is claimed is:

1. A current and voltage limiter comprising: a voltage source, a load supplied by said source, a first transistor, first means for deriving a first direct voltage proportional to the current supplied to said load by said source, said first means being connected between the base and emitter of said first transistor, a second transistor, second means for deriving a second direct voltage proportional to the voltage applied to said load by said source, the base-emitter circuit of said second transistor being coupled to the series circuit combination of said second means and a reference direct voltage source of opposite polarity, and circuit means for applying said first direct voltage between the base and emitter of said second transistor, said first direct voltage being applied with the same polarity as said reference direct voltage source, the collectors of said first and second transistors being coupled to the base of a third transistor, the emitter-collector circuit of the third transistor comprising a control impedance for controlling the voltage supplied by the source, whereby current limitation by said first transistor is abruptly replaced by voltage limitation by said second transistor.

2. A current and voltage limiter comprising: a voltage source, a load supplied by said source, a first transistor, first means having two terminals included in the circuit coupling said voltage source to said load for deriving a first direct voltage proportional to the current supplied to said load by said source, said first means being connected between the base and emitter of said first transistor, the base of said first transistor being connected to one terminal of said first means through a first resistor having a positive temperature coefficient and to the other terminal through a second resistor having negative temperature coefficient, a second transistor, second means for deriving a second direct voltage proportional to the voltage applied to said load by said source, the base-emitter circuit of said second transistor being coupled to the series circuit combination of said second means and a reference direct voltage source of opposite polarity, and circuit means for applying said first direct voltage between the base and emitter of said second transistor, said first direct voltage being applied with the same polarity as said reference direct voltage source, the collectors of said first and second transistors being coupled to the base of a third transistor, the emitter-collector circuit of the third transistor comprising a control impedance for controlling the voltage supplied by the source, whereby current limitation by said first transistor is abruptly replaced by voltage limitation by said second transistor.

3. A current and voltage limiter comprising: a direct voltage source, a load supplied by said source, a first transistor, a series resistor connected between one terminal of said source and a corresponding terminal of said load for deriving a first direct voltage proportional to the current supplied to said load by said source, said series resistor being coupled in a circuit between the base and emitter of said first transistor, a second transistor, means for deriving a second direct voltage proportional to the voltage applied to said load by said source, the base-emitter circuit of said second transistor being coupled to the series circuit combination of said means and a Zener diode acting as a reference direct voltage source of opposite polarity, the base of said second transistor being connected directly to one terminal of said Zener diode, a resistive circuit connection from the junction of said base and said Zener diode to said one terminal of said source, said resistive circuit connection applying a portion of said first direct voltage to the base of said second transistor with the same polarity as that of said reference direct voltage source, the emitter of said second transistor being connected to said corresponding terminal of the load, the collectors of said first and second transistors being coupled to the base of a third transistor, the emitter-collector circuit of the third transistor comprising a control impedance for controlling the voltage supplied by the source, whereby current limitation by said first transistor is abruptly replaced by voltage limitation by said second transistor.

4. A current and voltage limiter comprising: a direct voltage source, a load supplied by said source, a first transistor, a series resistor connected between one terminal of said source and a corresponding terminal of said load for deriving a first direct voltage proportional to the current supplied to said load by said source, said series resistor being coupled in a circuit between the base and emitter of said first transistor, the emitter of said first transistor being connected to said one terminal of said voltage source, a second transistor of the same conductivity type as said first transistor, means for deriving a second direct voltage proportional to the voltage applied to said load by said source, the base-emitter circuit of said second transistor being coupled to the series circuit combination of said means and a Zener diode acting as a reference direct voltage source of opposite polarity, the base of said second transistor being connected directly to one terminal of said Zener diode, a resistive circuit connection from the junction of said base and said Zener diode to said one terminal of said source, said resistive circuit connection applying a portion of said first direct voltage to the base of said second transistor with the same polarity as that of said reference direct voltage source, the emitter of said second transistor being connected to said corresponding terminal of the load, the collectors of said first and second transistors being connected through a common load resistor to the terminal of opposite polarity of said load and being coupled to the base of a third transistor, the emitter-collector circuit of the third transistor comprising a control impedance for controlling the voltage supplied by the source, whereby current limitation by said first transistor is abruptly replaced by voltage limitation by said second transistor.

5. An arrangement as claimed in claim 4, wherein said common load is provided with a tap-point, and a voltage-dependent resistor is connected from said tap-point to one of the terminals of said voltage source.

6. An arrangement as claimed in claim 4, wherein feedback capacitors are coupled between the emitter-collector circuit of said third transistor and the bases of said first and second transistors.

7. A current and voltage limiter comprising: a voltage source, a load supplied by said source, a first transistor, first means for deriving a first direct voltage proportional to the current supplied to said load by said source, said first means being connected between the base and emitter of said first transistor, a second transistor, second means for deriving a second direct voltage proportional to the voltage applied to said load by said source, the base-emitter circuit of said second transistor being coupled to the series circuit combination of said second means and a reference direct voltage source of opposite polarity, circuit means for applying said first direct voltage between the base and emitter of said second transistor, said first direct voltage being applied with the same polarity as said reference direct voltage source, and means for superimposing part of said second direct voltage on said first direct voltage applied to said first transistor to compensate for the variations of the collector voltage of the first transistor produced by variations of the applied voltage, the collectors of said first and second transistors being coupled to the base of a third transistor, the emitter-collector circuit of the third transistor comprising a control impedance for controlling the voltage supplied by the source, whereby current limitation by said first transistor is abruptly replaced by voltage limitation by said second transistor.

8. A current and voltage limiter comprising: a direct voltage source, a load supplied by said source, a first transistor, a series resistor connected between one terminal of said source and a corresponding terminal of said load for deriving a first direct voltage proportional to the current supplied to said load by said source, said series resistor being coupled in a circuit between the base and emitter of said first transistor, a second transistor, means for deriving a second direct voltage proportional to the voltage applied to said load by said source, the base-emitter circuit of said second transistor being coupled to the series circuit combination of said means and a Zener diode acting as a reference direct voltage source of opposite polarity, the base of said second transistor being connected directly to one terminal of said Zener diode, a resistive circuit connection from the junction of said base and said Zener diode to said one terminal of said source, said resistive circuit connection applying a portion of said first direct voltage to the base of said second transistor with the same polarity as that of said reference direct voltage source, the emitter of said second transistor being connected to said corresponding terminal of the load, the collectors of said first and second transistors being connected through a common load resistor to the terminal of opposite polarity of said load, and circuit means coupled between said means for deriving the second direct voltage and the base-emitter circuit of said first transistor to compensate for the variations of the collector voltage of the first transistor produced by variations of the applied voltage, the collectors of said first and second transistors being coupled to the base of a third transistor, the emitter-collector circuit of the third transistor comprising a control impedance for controlling the voltage supplied by the source, whereby current limitation by said first transistor is abruptly replaced by voltage limitation by said second transistor.

References Cited by the Examiner
UNITED STATES PATENTS

| | | | |
|---|---|---|---|
| 2,751,549 | 6/56 | Chase. | |
| 2,809,301 | 10/57 | Short. | |
| 2,912,635 | 11/59 | Moore | 322—25 |
| 3,059,167 | 10/62 | Byles | 322—25 |

LLOYD McCOLLUM, *Primary Examiner.*

MILTON O. HIRSHFIELD, RALPH D. BLAKESLEE,
*Examiners.*